United States Patent
Sato

(10) Patent No.: US 7,724,445 B2
(45) Date of Patent: May 25, 2010

(54) BIFOCAL IMAGING OPTICAL SYSTEM AND IMAGING APPARATUS

(75) Inventor: Kenichi Sato, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 287 days.

(21) Appl. No.: 11/860,998

(22) Filed: Sep. 25, 2007

(65) Prior Publication Data

US 2009/0002839 A1    Jan. 1, 2009

(30) Foreign Application Priority Data

Sep. 25, 2006    (JP) .................. P2006-258737
Sep. 18, 2007    (JP) .................. P2007-240972

(51) Int. Cl.
*G02B 15/02*    (2006.01)
*G02B 15/14*    (2006.01)
*G02B 13/18*    (2006.01)

(52) U.S. Cl. .................. 359/673; 359/672; 359/691; 359/717

(58) Field of Classification Search .................. 359/672, 359/673, 717, 716; *G02B 15/02*
See application file for complete search history.

(56) References Cited

U.S. PATENT DOCUMENTS

| | | | | | |
|---|---|---|---|---|---|
| 5,329,400 | A | * | 7/1994 | Miyano | 359/673 |
| 5,528,416 | A | * | 6/1996 | Hartmann | 359/673 |
| 7,274,515 | B2 | * | 9/2007 | Noda | 359/672 |

FOREIGN PATENT DOCUMENTS

JP      2005-265950 A     9/2005

* cited by examiner

*Primary Examiner*—Darryl J Collins
*Assistant Examiner*—Zachary Wilkes
(74) *Attorney, Agent, or Firm*—Birch, Stewart, Kolasch & Birch, LLP

(57) ABSTRACT

A configuration where a first group having a positive refractive power and a positive second group having a positive refractive power are placed sequentially from the object side is basically used. As the first group, a wide-angle first group and a telephoto first group are selectively switched over to be placed on the optical axis, thereby switching over the focal length between the wide-angle side and the telephoto side. Since the configuration in which the first group placed on the object side is switched is employed, adherence of dust or the like to the imaging surface due to the switching of the focal length can be prevented from occurring. Each group is configured by a minimum number of lenses. The whole system has a configuration which has a reduced number of lenses, and which is small and simple.

5 Claims, 15 Drawing Sheets

EXAMPLE 1

WIDE-ANGLE SIDE

TELEPHOTO SIDE

EXAMPLE 2

WIDE-ANGLE SIDE

TELEPHOTO SIDE

EXAMPLE 3

WIDE-ANGLE SIDE

TELEPHOTO SIDE

FIG. 4A

| EXAMPLE 1: BASIC LENS DATA OF WIDE-ANGLE SIDE ($f=3.78$, FNo.$=4.0$, $2\omega=63.3°$) | | | | |
|---|---|---|---|---|
| Si (SURFACE NUMBER) | Ri (RADIUS OF CURVATURE) | Di (SURFACE SEPARATION) | Ndj (REFRACTIVE INDEX) | $\nu$dj (ABBE NUMBER) |
| 0 (APERTURE DIAPHRAGM) | — | 0.10 | | |
| 1 | 1.463 | 1.20 | 1.509 | 53.9 |
| 2 | 2.318 | 0.80 | | |
| 3 | 1.745 | 0.80 | 1.509 | 53.9 |
| 4 | 2.131 | 1.25 | | |
| 5 | ∞ | 0.30 | 1.516 | 64.1 |
| 6 | ∞ | 0.00 | | |

G1w: surfaces 1–2
G2: surfaces 3–4
GC: surfaces 5–6

FIG. 4B

| EXAMPLE 1: ASPHERICAL SURFACE DATA OF WIDE-ANGLE SIDE | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | -3.495E+00 | -1.016E+01 | -2.615E+00 | -9.588E+00 |
| A3 | 0.000E+00 | 0.000E+00 | -3.331E-02 | -9.946E-03 |
| A4 | 1.861E-01 | 1.861E-01 | 2.256E-02 | 1.448E-01 |
| A5 | 0.000E+00 | 0.000E+00 | -7.008E-02 | -1.786E-01 |
| A6 | -8.367E-02 | -8.367E-02 | 6.438E-03 | 1.647E-02 |
| A7 | 0.000E+00 | 0.000E+00 | 1.564E-02 | 4.431E-02 |
| A8 | -6.367E-02 | -6.367E-02 | 4.107E-03 | -1.159E-02 |
| A9 | 0.000E+00 | 0.000E+00 | -5.388E-03 | -5.029E-03 |
| A10 | 1.479E-02 | 1.479E-02 | 1.006E-03 | 1.792E-03 |

FIG. 5A

| EXAMPLE 1: BASIC LENS DATA OF TELEPHOTO SIDE ($f=5.80$, FNo.$=5.6$, $2\omega=43.0°$) | | | | |
|---|---|---|---|---|
| Si (SURFACE NUMBER) | Ri (RADIUS OF CURVATURE) | Di (SURFACE SEPARATION) | Ndj (REFRACTIVE INDEX) | $\nu$dj (ABBE NUMBER) |
| 0 (APERTURE DIAPHRAGM) | — | 0.10 | | |
| 1 | 1.237 | 0.90 | 1.516 | 64.1 |
| 2 | 1.217 | 0.67 | | |
| 3 | 1.745 | 0.80 | 1.517 | 53.9 |
| 4 | 2.131 | 2.87 | | |
| 5 | ∞ | 0.30 | 1.516 | 64.1 |
| 6 | ∞ | 0.00 | | |

G1t: surfaces 1, 2
G2: surfaces 3, 4
GC: surfaces 5, 6

FIG. 5B

| EXAMPLE 1: ASPHERICAL SURFACE DATA OF TELEPHOTO SIDE | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | $-1.216E+00$ | $8.863E-01$ | $-2.615E+00$ | $-9.588E+00$ |
| A3 | $0.000E+00$ | $0.000E+00$ | $-3.331E-02$ | $-9.946E-03$ |
| A4 | $1.276E-01$ | $1.276E-01$ | $2.256E-02$ | $1.448E-01$ |
| A5 | $0.000E+00$ | $0.000E+00$ | $-7.008E-02$ | $-1.786E-01$ |
| A6 | $-7.503E-03$ | $-7.503E-03$ | $6.438E-03$ | $1.647E-02$ |
| A7 | $0.000E+00$ | $0.000E+00$ | $1.564E-02$ | $4.431E-02$ |
| A8 | $-5.632E-02$ | $-5.632E-02$ | $4.107E-03$ | $-1.159E-02$ |
| A9 | $0.000E+00$ | $0.000E+00$ | $-5.388E-03$ | $-5.029E-03$ |
| A10 | $1.650E-02$ | $1.650E-02$ | $1.006E-03$ | $1.792E-03$ |

FIG. 6A

| EXAMPLE 2: BASIC LENS DATA OF WIDE-ANGLE SIDE ($f=3.80$, FNo. $=4.0$, $2\omega=62.3°$) | | | | |
|---|---|---|---|---|
| Si (SURFACE NUMBER) | Ri (RADIUS OF CURVATURE) | Di (SURFACE SEPARATION) | Ndj (REFRACTIVE INDEX) | $\nu$dj (ABBE NUMBER) |
| 0 (APERTURE DIAPHRAGM) | — | 1.00 | | |
| 1 | 1.338 | 1.00 | 1.494 | 65.2 |
| 2 | 1.907 | 0.70 | | |
| 3 | 2.135 | 0.80 | 1.509 | 53.9 |
| 4 | 3.797 | 1.55 | | |
| 5 | ∞ | 0.30 | 1.516 | 64.1 |
| 6 | ∞ | 0.00 | | |

| EXAMPLE 2: ASPHERICAL SURFACE DATA OF WIDE-ANGLE SIDE | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | -2.979E+00 | -6.216E+00 | -2.854E+00 | -1.071E+01 |
| A3 | 0.000E+00 | 0.000E+00 | -1.404E-02 | -2.627E-02 |
| A4 | 2.098E-01 | 2.098E-01 | 2.140E-02 | 1.556E-01 |
| A5 | 0.000E+00 | 0.000E+00 | -6.558E-02 | -1.688E-01 |
| A6 | -8.086E-02 | -8.086E-02 | 7.871E-03 | 1.598E-02 |
| A7 | 0.000E+00 | 0.000E+00 | 1.606E-02 | 4.155E-02 |
| A8 | -6.366E-02 | -6.366E-02 | 3.868E-03 | -1.207E-02 |
| A9 | 0.000E+00 | 0.000E+00 | -5.776E-03 | -4.885E-03 |
| A10 | 1.479E-02 | 1.479E-02 | 1.105E-03 | 2.047E-03 |

FIG. 7A

| EXAMPLE 2: BASIC LENS DATA OF TELEPHOTO SIDE ($f=5.88$, FNo.$=5.6$, $2\omega=41.6°$) | | | | |
|---|---|---|---|---|
| Si (SURFACE NUMBER) | Ri (RADIUS OF CURVATURE) | Di (SURFACE SEPARATION) | Ndj (REFRACTIVE INDEX) | $\nu$dj (ABBE NUMBER) |
| 0 (APERTURE DIAPHRAGM) | — | 1.00 | | |
| 1 | 1.301 | 0.90 | 1.516 | 64.1 |
| 2 | 1.222 | 0.22 | | |
| 3 | 2.135 | 0.80 | 1.517 | 53.9 |
| 4 | 3.797 | 3.42 | | |
| 5 | ∞ | 0.30 | 1.516 | 64.1 |
| 6 | ∞ | 0.00 | | |

G1t: surfaces 1, 2
G2: surfaces 3, 4
G3: surfaces 5, 6

FIG. 7B

| EXAMPLE 2: ASPHERICAL SURFACE DATA OF TELEPHOTO SIDE | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | -9.847E-01 | -5.082E-01 | -2.854E+00 | -1.071E+01 |
| A3 | 0.000E+00 | 0.000E+00 | -1.404E-02 | -2.627E-02 |
| A4 | 1.075E-01 | 1.075E-01 | 2.140E-02 | 1.556E-01 |
| A5 | 0.000E+00 | 0.000E+00 | -6.558E-02 | -1.688E-01 |
| A6 | -1.600E-02 | -1.600E-02 | 7.871E-03 | 1.598E-02 |
| A7 | 0.000E+00 | 0.000E+00 | 1.606E-02 | 4.155E-02 |
| A8 | -6.176E-02 | -6.176E-02 | 3.868E-03 | -1.207E-02 |
| A9 | 0.000E+00 | 0.000E+00 | -5.776E-03 | -4.885E-03 |
| A10 | 1.617E-02 | 1.617E-02 | 1.105E-03 | 2.047E-03 |

FIG. 8A

| EXAMPLE 3: BASIC LENS DATA OF WIDE-ANGLE SIDE ($f=3.78$, FNo.$=4.0$, $2\omega=63.3°$) | | | | |
|---|---|---|---|---|
| Si (SURFACE NUMBER) | Ri (RADIUS OF CURVATURE) | Di (SURFACE SEPARATION) | Ndj (REFRACTIVE INDEX) | $\nu$dj (ABBE NUMBER) |
| 0 (APERTURE DIAPHRAGM) | — | 0.10 | | |
| 1 | 1.463 | 1.20 | 1.509 | 53.9 |
| 2 | 2.318 | 0.80 | | |
| 3 | 1.745 | 0.80 | 1.509 | 53.9 |
| 4 | 2.131 | 1.25 | | |
| 5 | ∞ | 0.30 | 1.516 | 64.1 |
| 6 | ∞ | 0.00 | | |

G1w: surfaces 1, 2
G2: surfaces 3, 4
GC: surfaces 5, 6

FIG. 8B

| EXAMPLE 3: ASPHERICAL SURFACE DATA OF WIDE-ANGLE SIDE | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | -3.495E+00 | -1.016E+01 | -2.615E+00 | -9.588E+00 |
| A3 | 0.000E+00 | 0.000E+00 | -3.331E-02 | -9.946E-03 |
| A4 | 1.861E-01 | 1.861E-01 | 2.256E-02 | 1.448E-01 |
| A5 | 0.000E+00 | 0.000E+00 | -7.008E-02 | -1.786E-01 |
| A6 | -8.367E-02 | -8.367E-02 | 6.438E-03 | 1.647E-02 |
| A7 | 0.000E+00 | 0.000E+00 | 1.564E-02 | 4.431E-02 |
| A8 | -6.367E-02 | -6.367E-02 | 4.107E-03 | -1.159E-02 |
| A9 | 0.000E+00 | 0.000E+00 | -5.388E-03 | -5.029E-03 |
| A10 | 1.479E-02 | 1.479E-02 | 1.006E-03 | 1.792E-03 |

FIG. 9A

| EXAMPLE 3: BASIC LENS DATA OF TELEPHOTO SIDE | | | | |
|---|---|---|---|---|
| ($f=6.59$, FNo. $=5.6$, $2\omega=37.7°$) | | | | |
| Si (SURFACE NUMBER) | Ri (RADIUS OF CURVATURE) | Di (SURFACE SEPARATION) | Ndj (REFRACTIVE INDEX) | $\nu$dj (ABBE NUMBER) |
| 0 (APERTURE DIAPHRAGM) | — | 0.10 | | |
| 1 | 1.352 | 0.40 | 1.487 | 70.4 |
| 2 | 1.186 | 0.10 | | |
| 3 | 0.791 | 0.40 | 1.509 | 53.9 |
| 4 | 0.777 | 0.50 | | |
| 5 | 1.745 | 0.80 | 1.509 | 53.9 |
| 6 | 2.131 | 3.50 | | |
| 7 | ∞ | 0.30 | 1.516 | 64.1 |
| 8 | ∞ | 0.00 | | |

G1t: surfaces 1–4
G2: surfaces 5–6
GC: surfaces 7–8

FIG. 9B

| EXAMPLE 3: ASPHERICAL SURFACE DATA OF TELEPHOTO SIDE | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | 1.937E-01 | -2.059E+00 | -7.301E-01 | 1.676E-01 |
| A4 | 4.027E-02 | -1.125E-01 | 5.924E-04 | -5.894E-03 |
| A6 | -1.306E-02 | 1.603E-01 | 9.870E-04 | 1.145E-04 |
| A8 | 3.541E-02 | -5.607-02 | 7.131E-05 | 1.023E-05 |
| A10 | 8.406E-03 | 1.670E-02 | 2.849E-06 | 7.792E-07 |

| | FIFTH SURFACE | SIXTH SURFACE |
|---|---|---|
| K | -2.615E+00 | -9.588E+00 |
| A3 | -3.331E-02 | -9.946E-03 |
| A4 | 2.256E-02 | 1.448E-01 |
| A5 | -7.008E-02 | -1.786E-01 |
| A6 | 6.438E-03 | 1.647E-02 |
| A7 | 1.564E-02 | 4.431E-02 |
| A8 | 4.107E-03 | -1.159E-02 |
| A9 | -5.388E-03 | -5.029E-03 |
| A10 | 1.006E-03 | 1.792E-03 |

FIG. 10

| VALUES RELATING TO CONDITIONAL EXPRESSIONS | | | |
|---|---|---|---|
| | CONDITIONAL EXPRESSION (1) f1w/fw | CONDITIONAL EXPRESSION (2) f2/fw | CONDITIONAL EXPRESSION (3) f1t/fw |
| EXAMPLE 1 | 1.40 | 2.94 | 2.69 |
| EXAMPLE 2 | 1.51 | 2.17 | 3.56 |
| EXAMPLE 3 | 1.40 | 2.94 | 3.59 |

EXAMPLE 1 (WIDE-ANGLE SIDE)
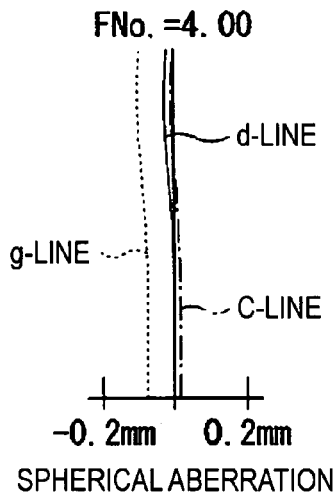
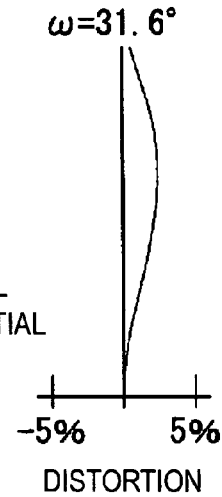
FIG. 11A  FIG. 11B  FIG. 11C
EXAMPLE 1 (TELEPHOTO SIDE)
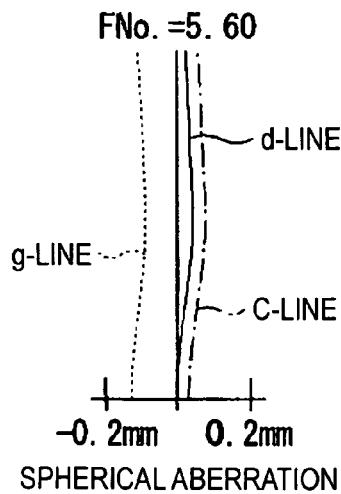
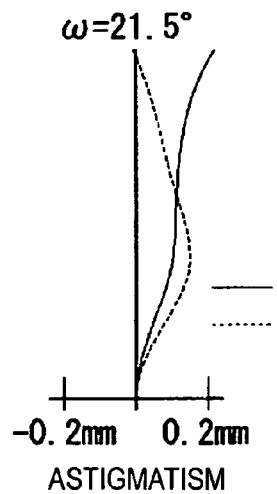
FIG. 12A  FIG. 12B  FIG. 12C

EXAMPLE 2 (WIDE-ANGLE SIDE)

EXAMPLE 2 (TELEPHOTO SIDE)

EXAMPLE 3 (WIDE-ANGLE SIDE)

EXAMPLE 3 (TELEPHOTO SIDE)

BIFOCAL IMAGING OPTICAL SYSTEM AND IMAGING APPARATUS

BACKGROUND OF THE INVENTION

1. Field of the Invention

The present invention relates to an imaging optical system to be mounted on an imaging apparatus using an imaging device such as a CCD (Charge Coupled Device) or a CMOS (Complementary Metal Oxide Semiconductor), a digital still camera, a camera-equipped portable telephone, or a personal digital assistance (PDA), and more particularly relates to a bifocal imaging optical system in which the focal length can be switched over to a wide-angle side and a telephoto side.

2. Description of Related Art

In a recent imaging device such as a CCD or a CMOS, miniaturization and increase of pixels are highly advancing. Therefore, also the body of an imaging apparatus, and lenses mounted thereon are requested to be further miniaturized and have a higher performance. As an imaging lens to be mounted on, for example, a camera-equipped portable telephone, a system having a simple lens configuration which is allowed to have only two or three lenses by using many aspherical surfaces is known. When such a simple lens configuration is employed, it is difficult to configure the imaging lens as a zoom lens, and the imaging lens is inevitably configured as a single-focal lens. However, a request for, also in a portable imaging apparatus, performing a telephoto imaging operation in addition to an imaging operation at a normal field angle is increasing. When the number of lenses is increased, it is possible to configure a zoom lens. In this case, however, the cost is increased, and also the size of the whole configuration is increased. Alternatively, a method in which the focal length is changed by externally attaching an attachment lens to the main lens system may be employed. In the method, however, a further optical system must be added to the main lens system. Therefore, the size of the configuration is increased, and hence the method is not suitable for a portable imaging apparatus.

JP-A-2005-265950 discloses an invention of a bifocal lens which does not have a configuration where an attachment lens is added to the main lens system, but has a configuration where a part of the main lens system is selectively interchanged to switch over the focal length between a wide-angle side and a telephoto side. The bifocal lens disclosed in JP-A-2005-265950 includes two lens groups of a first lens group and a second lens group, sequentially from the object side. The second lens group consists of a second group on a wide-angle side and a second group on a telephoto side. In a wide-angle side, a main lens system on a wide-angle side is configured by a combination of the first lens group and the second group on a wide-angle side, and, in a telephoto side, a main lens system on a telephoto side is configured by the first lens group and the second group on a telephoto side. In this way, the focal length is switched between the wide-angle side and the telephoto side by replacing the lens groups on the image side with each other. As a specific example, JP-A-2005-265950 discloses a configuration in which the first lens group consists of two lenses, and the second group consists of two or three lenses.

In the lens disclosed in JP-A-2005-265950, the main lens system is partly interchanged, and therefore it is possible to realize size reduction as compared with the case where an attachment lens is added to the main lens system. However, the bifocal lens disclosed in JP-A-2005-265950 employs the method in which the lens groups on the side adjacent to the imaging surface are interchanged with each other, and hence there is a possibility such as that dust adheres to the imaging surface with the interchange of the lens groups. Usually, a cover glass is placed in front of the imaging surface. In such a case, there is a possibility such as that dust adheres to the cover glass. The example disclosed in JP-A-2005-265950 has a large total number of lenses for an imaging lens to be mounted on a camera-equipped portable telephone or the like, and therefore is insufficient from the viewpoint of miniaturization.

SUMMARY OF THE INVENTION

An object of an illustrative, non-limiting embodiment of the invention is to provide a bifocal imaging optical system in which, although a small and simple lens configuration is employed, the focal length can be switched between the wide-angle side and the telephoto side, and adherence of dust or the like to an imaging surface due to the switching of the focal length can be prevented from occurring. Another object of an illustrative, non-limiting embodiment of the invention is to provide an imaging apparatus in which the bifocal imaging optical system is mounted and the imaging operation can be easily switched between the wide-angle imaging operation and the telephoto imaging operation.

According to an aspect of the invention, there is provided a bifocal imaging optical system comprising:

a first group for wide angle imaging, which includes one lens and has a positive refractive power;

a first group for telephoto imaging, which includes one or two lenses and has a positive refractive power as a whole; and a second group including one lens and having a positive refractive power, the second group being commonly used for both of the first group for wide angle imaging and the first group for telephoto imaging, wherein each of the first group for wide angle imaging, the first group for telephoto imaging and the second group has at least one aspherical surface, the first group for a wide angle and the first group for a telephoto are selectively used so as to switch an overall focal length of the bifocal imaging optical system between two focal lengths, wherein when a wide-angle imaging operation is performed, the first group for wide angle imaging and the second group are arranged on an optical axis sequentially from an object side of the bifocal imaging optical system, and when a telephoto imaging operation is performed, the first group for telephoto imaging and the second group are arranged on the optical axis sequentially from the object side, and the bifocal imaging optical system satisfies conditional expressions:

$$1.0 < f1w/fw < 3.0 \tag{1}$$

$$2.0 < f2/fw < 4.0 \tag{2}$$

$$2.5 < f1t/fw < 4.0 \tag{3}$$

wherein fw is an overall focal length of the bifocal imaging optical system in a wide-angle side, f1w is a focal length of the first group for wide angle imaging, f1t is focal length of the first group for telephoto imaging, and f2 is a focal length of the second group.

The bifocal imaging optical system according to an aspect of the invention is based on the configuration where the first group having a positive refractive power and the second group having a positive refractive power are placed sequentially from the object side. As the first group, the first group for wide angle imaging and the first group for telephoto imaging are selectively switched over to be placed on the optical axis, whereby the focal length is switched between the wide-angle side and the telephoto side. Since the configuration in which the first group placed on the object side is switched is employed, adherence of dust or the like to the imaging surface due to the switching of the focal length can be prevented from occurring. In the bifocal imaging optical system, each group is configured by one or two lenses. Therefore, the total number of lenses is small, and the configuration is reduced in size and simplified. In this case, each of the groups has at least one aspherical surface, and the conditional expressions are satisfied to optimize the refractive powers of the lens groups. Although the configuration is reduced in size and simplified, therefore, the performance can be enhanced.

In the bifocal imaging optical system, the first group for wide angle imaging may be configured by a meniscus lens having a positive refractive power and having a convex surface on the object side. The first group for telephoto imaging may include at least one meniscus lens having a positive refractive power and having a convex surface on the object side. The second group may be configured by a meniscus lens having a positive refractive power and having a convex surface on the object side in the vicinity of the optical axis. The second group may be a plastic lens.

According to the configurations above, although the lens configuration has a reduced number of lenses or several lenses as a whole, the shapes of the lenses, and the like are optimized, and the performance can be more easily enhanced.

According to an aspect of the invention, there is provided an imaging apparatus comprising: a bifocal imaging optical system of the invention; and an imaging device that outputs an imaging signal corresponding to an optical image formed by the bifocal imaging optical system.

According to the imaging apparatus, the focal length is selectively switched over by the bifocal imaging optical system of the invention depending on the wide-angle imaging operation or the telephoto imaging operation. The imaging signal is obtained on the basis of the optical image formed by the selected imaging operation, and a photographed image is obtained based on the imaging signal.

BRIEF DESCRIPTION OF THE DRAWINGS

The features of the invention will appear more fully upon consideration of the exemplary embodiment of the invention, which are schematically set forth in the drawings, in which:

FIG. 1A shows the configuration in a wide-angle imaging operation, and FIG. 1B shows the configuration in a telephoto imaging operation;

FIG. 2A shows the configuration in a wide-angle imaging operation, and FIG. 2B shows the configuration in a telephoto imaging operation;

FIG. 3A shows the configuration in a wide-angle imaging operation, and FIG. 3B shows the configuration in a telephoto imaging operation;

FIG. 4A shows basic lens data of the wide-angle side of the bifocal imaging optical system of Example 1, and FIG. 4B shows lens data relating to an aspherical surface;

FIG. 5A shows basic lens data of the telephoto side of the bifocal imaging optical system of Example 1, and FIG. 5B shows lens data relating to an aspherical surface;

FIG. 6A shows basic lens data of the wide-angle side of the bifocal imaging optical system of Example 2, and FIG. 6B shows lens data relating to an aspherical surface;

FIG. 7A shows basic lens data of the telephoto side of the bifocal imaging optical system of Example 2, and FIG. 7B shows lens data relating to an aspherical surface;

FIG. 8A shows basic lens data of the wide-angle side of the bifocal imaging optical system of Example 3, and FIG. 8B shows lens data relating to an aspherical surface;

FIG. 8A shows basic lens data of the telephoto side of the bifocal imaging optical system of Example 3, and FIG. 8B shows lens data relating to an aspherical surface;

FIGS. 9A and 9B show specific values relating to conditional expressions for the examples shown in FIG. 3B;

FIG. 10 shows specific values relating to conditional expressions;

FIGS. 11A to 11C are views showing spherical aberration, astigmatism and distortion of the wide-angle side of the bifocal imaging optical system of Example 1, respectively;

FIGS. 12A to 12C are views showing spherical aberration, astigmatism and distortion of the telephoto side of the bifocal imaging optical system of Example 1, respectively;

DETAILED DESCRIPTION OF THE EXEMPLARY EMBODIMENTS

Although the invention will be described below with reference to exemplary embodiments thereof, the following exemplary embodiments and modifications do not restrict the invention.

Exemplary embodiments of the invention will be described in detail with reference to the accompanying drawings.

Figure 1A:
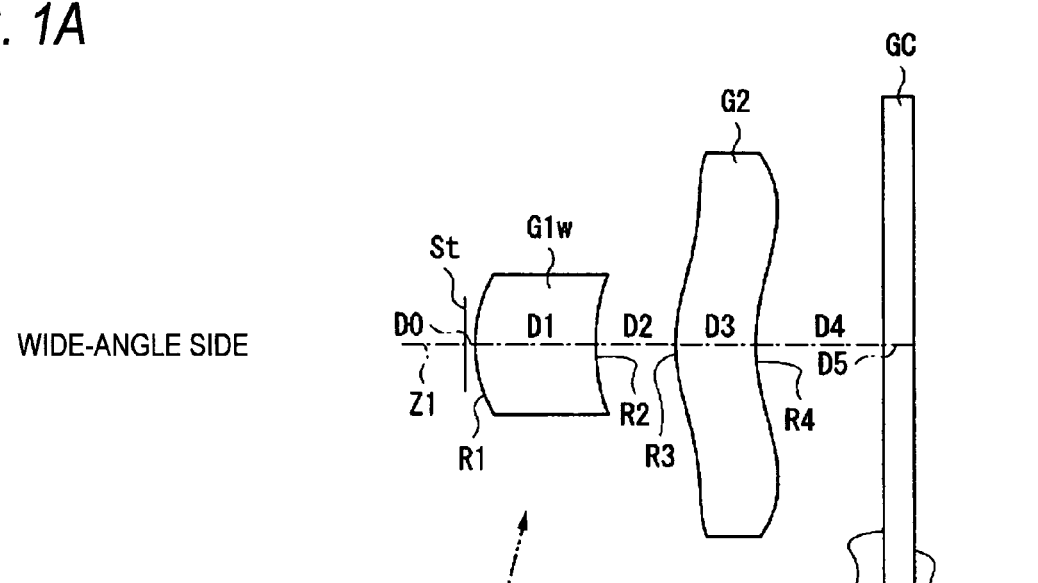
FIGS. 1A and 1B are lens section views of a bifocal imaging optical system of Example 1 according to an exemplary embodiment of the invention.
Figure 1B:
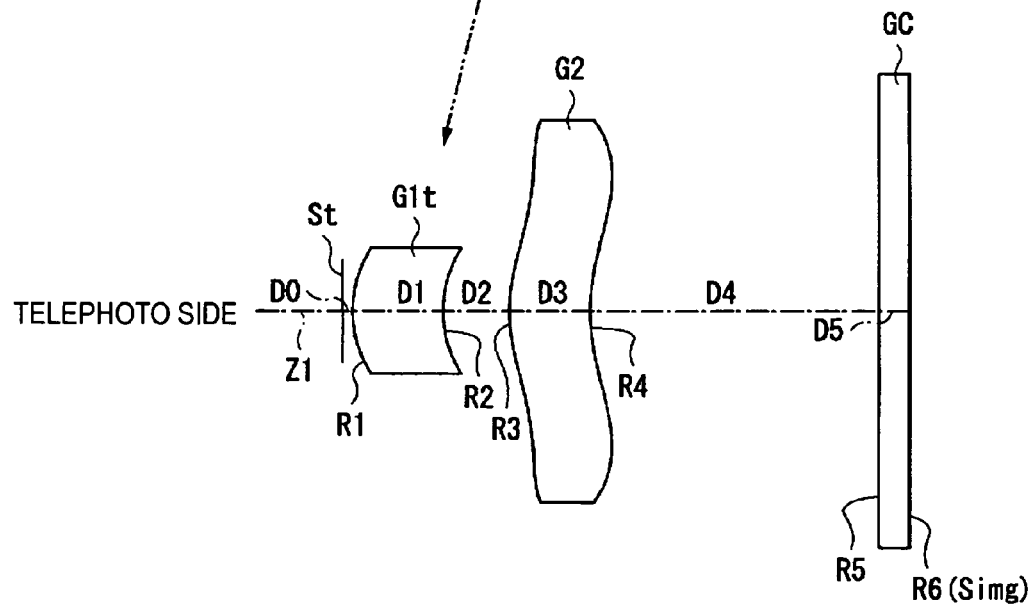
Figure 2A:
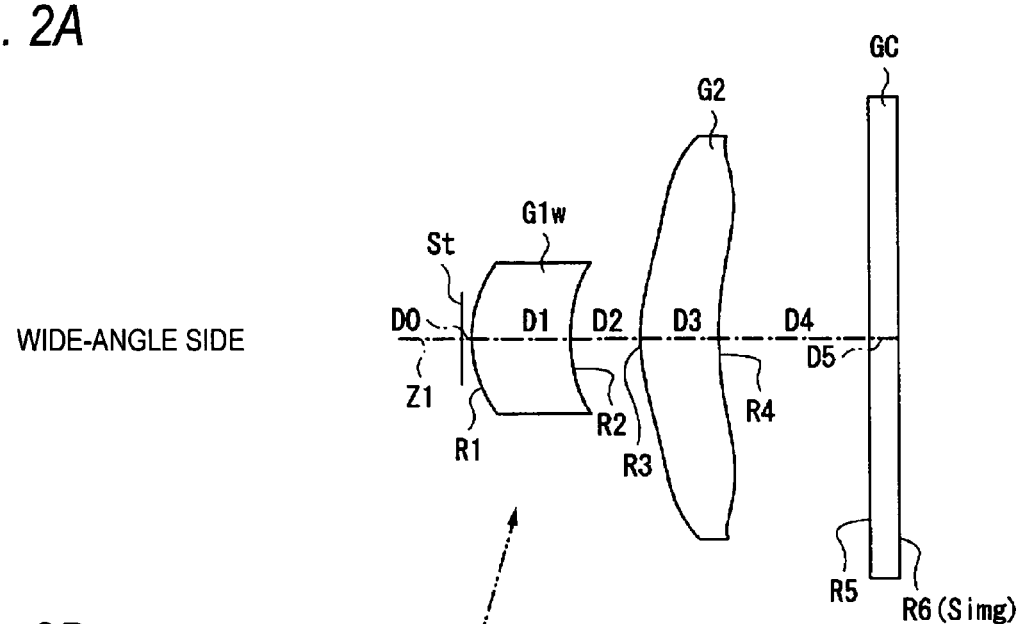
FIGS. 2A and 2B are lens section views of a bifocal imaging optical system of Example 2 according to an exemplary embodiment of the invention.
Figure 2B:
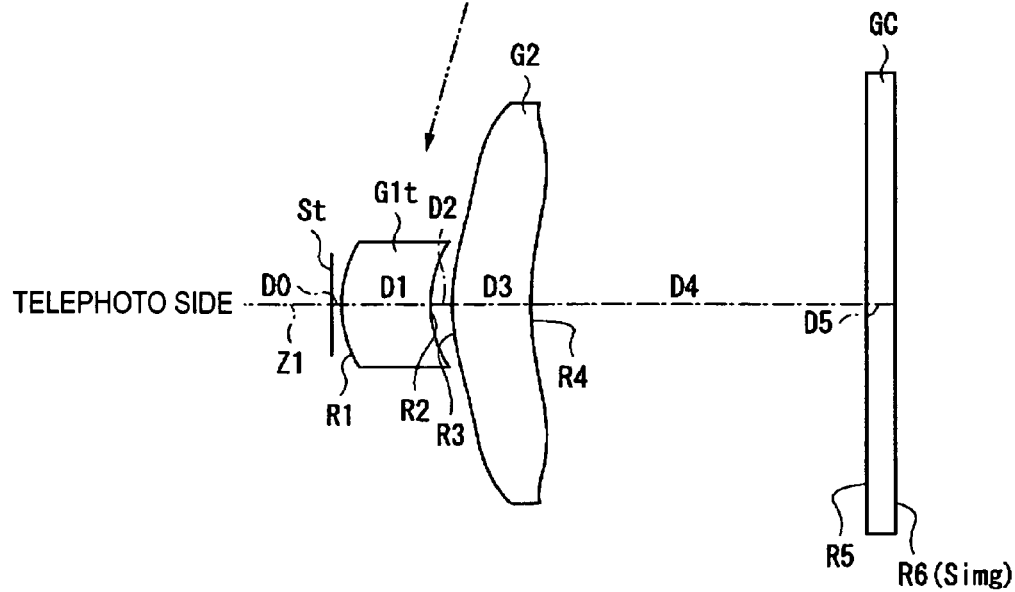
Figure 3A:
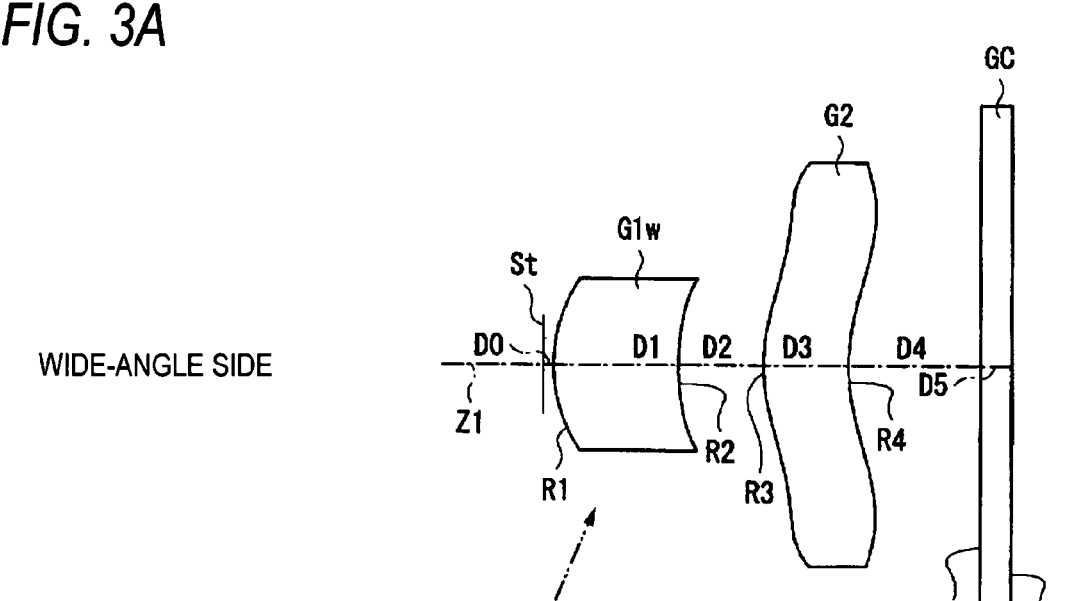
FIGS. 3A and 3B are lens section views of a bifocal imaging optical system of Example 3 according to an exemplary embodiment of the invention.
Figure 3B:
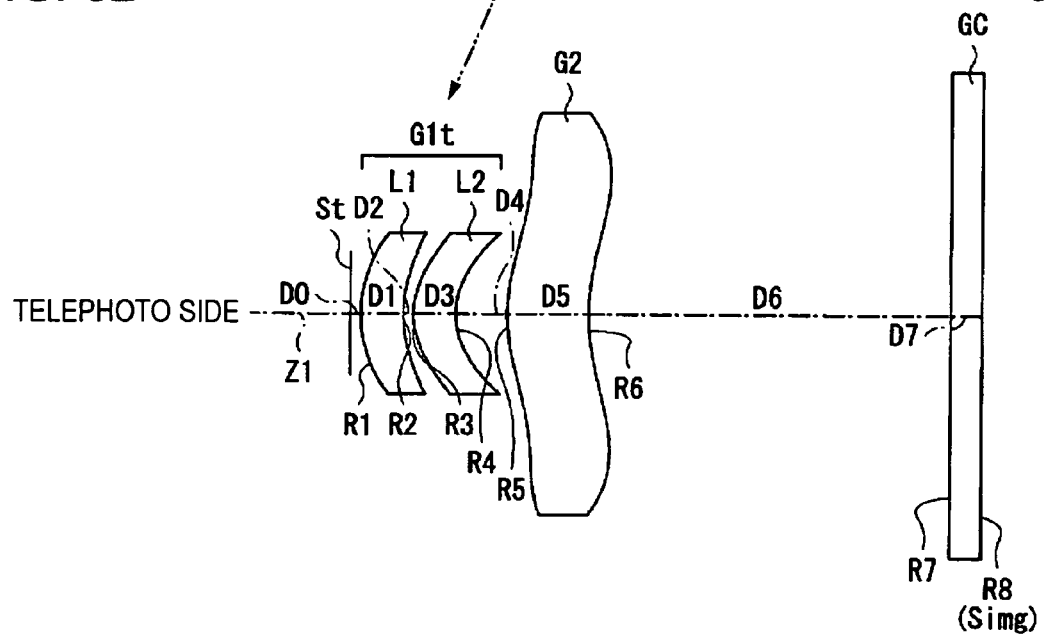

FIGS. 1A and 1B show a first configuration example of a bifocal imaging optical system of an embodiment of the invention. Particularly, FIG. 1A shows the configuration on a wide-angle side of the first configuration example, and corresponds to the lens configuration of a first numerical example (FIGS. 4A and 4B) which will be described later. FIG. 1B shows the configuration on a telephoto side of the first configuration example, and corresponds to the lens configuration of the first numerical example (FIGS. 5A and 5B) which will be described later. FIGS. 2A and 2B show a second configuration example. Particularly, FIG. 2A shows the configuration on a wide-angle side of the second configuration example, and corresponds to the lens configuration of a second numerical example (FIGS. 6A and 6B) which will be described later. FIG. 2B shows the configuration on a telephoto side of the second configuration example, and corresponds to the lens configuration of the second numerical example (FIGS. 7A and 7B) which will be described later. FIGS. 3A and 3B show a third configuration example. Particularly, FIG. 3A shows the configuration on a wide-angle side of the second configuration example, and corresponds to the lens configuration of a third numerical example (FIGS. 8A and 8B) which will be described later. FIG. 3B shows the configuration on a telephoto side of the third configuration example, and corresponds to the lens configuration of the third numerical example (FIGS. 9A and 9B) which will be described later. In each of the configuration examples, the reference character Ri indicates the radius of curvature of an i-th surface which is numbered in such a manner that the surface of a component that is closest to the object side is set as the first surface, and the number is more sequentially increased as further advancing toward the image side (image formation side). The reference character Di indicates the surface separation on the optical axis Z1 between i-th and (i+1)-th surfaces. The configuration examples have the same basic configuration.

The bifocal imaging optical system can be used in an imaging apparatus using an imaging device such as a CCD or a CMOS, a digital still camera, a camera-equipped portable telephone, or a personal digital assistance. The bifocal imaging optical system is based on the configuration where a first group having positive refractive power, and a second group G2 having positive refractive power are placed along the optical axis Z1 sequentially from the object side. An optical aperture diaphragm St can be placed as close as possible to the object side in order to ensure the telecentricity. In the configuration examples, the aperture diaphragm St is placed in front of the first group and at a position of the lens system which is closest to the object side.

An imaging device such as a CCD is placed in the imaging surface Simg of the bifocal imaging optical system. In accordance with the configuration of a camera to which the lens is to be attached, various optical components GC are placed between the second group G2 and the imaging device. For example, planar optical components such as a cover glass for protecting the imaging surface, and an infrared blocking filter are placed. In the configuration examples of FIGS. 1A and 1B to 3A and 3B, the image-side surface of the optical component GC is made coincident with the imaging surface.

The first group is configured by a first group G1w for wide angle imaging (hereinafter, often referred to as wide-angle first group G1w), and a first group G1t for telephoto imaging (hereinafter, often referred to as telephoto first group G1t). The second group G2 is used commonly for the wide-angle first group G1w and the telephoto first group G1t. The wide-angle first group G1w and the telephoto first group G1t are selectively used. In a wide-angle imaging operation, the wide-angle first group G1w and the second group G2 are placed on the optical axis Z1 sequentially from the object side as shown in FIG. 1A, and, in a telephoto imaging operation, the telephoto first group G1t and the second group G2 are placed on the optical axis Z1 sequentially from the object side as shown in FIG. 1B. When the wide-angle first group G1w and the telephoto first group G1t are selectively switched to be used, the overall focal length can be switched to either of two focal lengths, i.e. a wide-angle focal length or a telephoto focal length. In the telephoto side, the focal length is prolonged. When the switching is performed from the wide-angle to the telephoto side, therefore, each group is moved on the whole toward the object side with reference to the imaging surface, as compared with the configuration for the wide angle.

Each of the wide-angle first group G1w, the telephoto first group G1t and the second group G2 is configured by at least one lens having a positive refractive power. Moreover, each of the groups may have at least one aspherical surface. The wide-angle first group G1w may be configured by a meniscus lens having a positive refractive power and having a convex surface on the object side. The telephoto first group G1t may be configured by at least one meniscus lens having a positive refractive power and having a convex surface on the object side, and the second group G2 may be configured by a meniscus lens having a positive refractive power and having a convex surface on the object side in the vicinity of the optical axis.

In the configuration example shown in FIGS. 1A, 1B, 2A and 2B, each of the wide-angle first group G1w and the telephoto first group G1t is configured by a single lens. Alternatively, one or both of the groups may be configured by two lenses. Particularly, chromatic aberration easily occurs in the telephoto side. In the case where the performance is to be enhanced, therefore, the telephoto first group G1t may be configured by two lenses. In the configuration example shown in FIG. 3B, the telescope first group G1t is configured by two meniscus lenses L1, L2, in each of which a convex surface is directed to the object side.

The second group G2 is a lens placed on the side of the imaging surface, and hence the light flux is separated for each field angle as compared with the first group. When an aspherical surface is adequately used in the second group G2, therefore, aberration correction for each field angle can be easily performed, and curvature of filed and distortion can be readily corrected. Moreover, the telecentricity can be easily ensured. Consequently, each lens surface of the second group G2 may have different shapes between in a portion in the vicinity of the optical axis and in a peripheral portion thereof. As in the configuration example of FIGS. 1A and 1B, for example, the object-side surface of the second group G2 is configured so that a portion in the vicinity of the optical axis has a convex shape, and a peripheral portion has a concave shape. In the image-side surface, a portion in the vicinity of the optical axis may have a concave shape, and a peripheral portion may have a convex shape. In order to form such a complex aspherical shape, preferably, the second group G2 is a plastic lens from the viewpoint of workability.

The bifocal imaging optical system satisfies following conditional expressions:

$$1.0 < f1w/fw < 3.0 \quad (1)$$

$$2.0 < f2/fw < 4.0 \quad (2)$$

$$2.5 < f1t/fw < 4.0 \quad (3)$$

where fw is the overall focal length in the wide-angle side, f1w is the focal length of the wide-angle first group G1w, f1t is the focal length of the telephoto first group G1t, and f2 is the focal length of the second group G2.

Next, the function and effects of the thus configured bifocal imaging optical system will be described.

In the bifocal imaging optical system, the wide-angle first group G1w and the telephoto first group G1t are selectively switched over to be placed on the optical axis Z1 as the first group, whereby the focal length is switched between the wide-angle side and the telephoto side. Since the configuration in which the first group placed on the object side is switched is employed, adherence of dust or the like to the imaging surface due to the switching of the focal length can be prevented from occurring. In the bifocal imaging optical system, each group is configured by one lens (or two lenses). Therefore, the total number of lenses is small, and the configuration is reduced in size and simplified. In this case, each of the groups has at least one aspherical surface, and the conditional expressions are satisfied to optimize the refractive powers of the lens groups. Although the configuration is reduced in size and simplified, therefore, the performance can be enhanced.

Conditional expressions (1) to (3) relate to the focal lengths of the lenses. When the focal lengths are deviated from the numerical ranges, the power balance among the lenses is lost, and miniaturization and high performance are difficult to be simultaneously attained. When these conditions are satisfied, the power balance among the lenses is optimized in both the aide-angle side and the telephoto side, and hence miniaturization and high performance can be readily realized.

In the bifocal imaging optical system, the aperture diaphragm St is placed in front of the first group, and therefore a lens system which is advantageous to shortening of the whole length and ensurance of the telecentricity can be obtained. In the bifocal imaging optical system, the aspherical surfaces of the surfaces are optimized, whereby further effective aberration correction is enabled. In order to cope with an imaging device having an increased pixel number, it is requested to attain the telecentricity, i.e., to make the incident angle of the principal ray to the imaging device substantially parallel to the optical axis (the incident angle in the imaging surface is substantially zero with respect to the normal line of the imaging surface). For example, the image-side surface of the second group G2 which is the final lens surface closest to the imaging device has a shape which is concave to the image side in the vicinity of the optical axis and convex to the image side in a peripheral portion, whereby aberration correction for each field angle is adequately performed and the incident angle of the light flux to the imaging device is controlled to a constant angle or less. According to the configuration, light quantity unevenness in the whole imaging surface can be reduced, and it is advantageous to correction of curvature of filed and distortion aberration.

As described above, according to the bifocal imaging optical system of the embodiment, although the lens configuration is reduced in size and simplified, the focal length can be switched between the wide-angle side and the telephoto side, and adherence of dust or the like to the imaging surface due to the switching of the focal length can be prevented from occurring.

Next, a focus switching mechanism (lens switching mechanism) for switching over the wide-angle side and the telescope side in the bifocal imaging optical system of an embodiment will be described.

Figure 17:
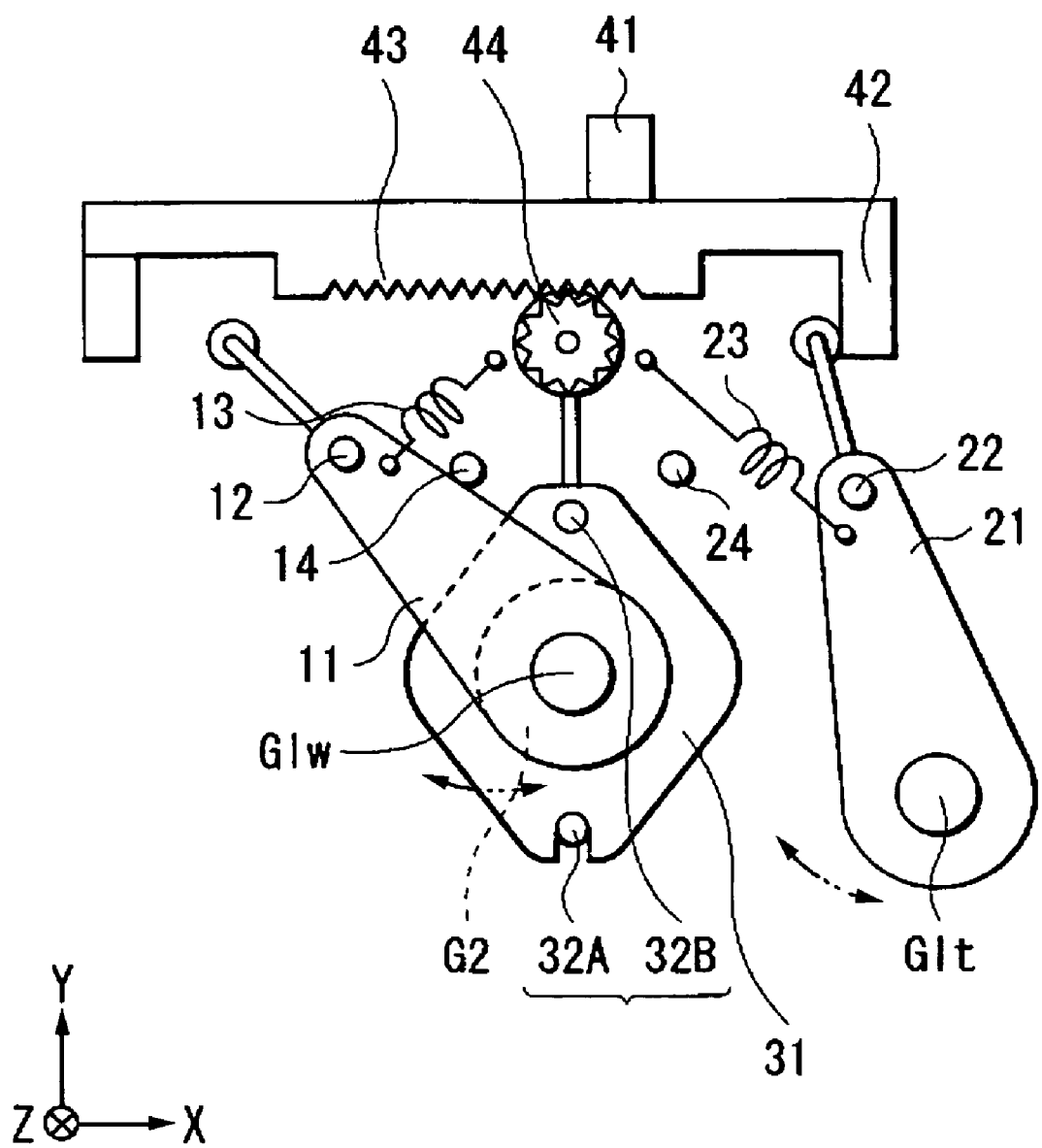
FIG. 17 is a front view showing a focus switching mechanism of a bifocal imaging optical system of an exemplary embodiment of the invention.
Figure 18:
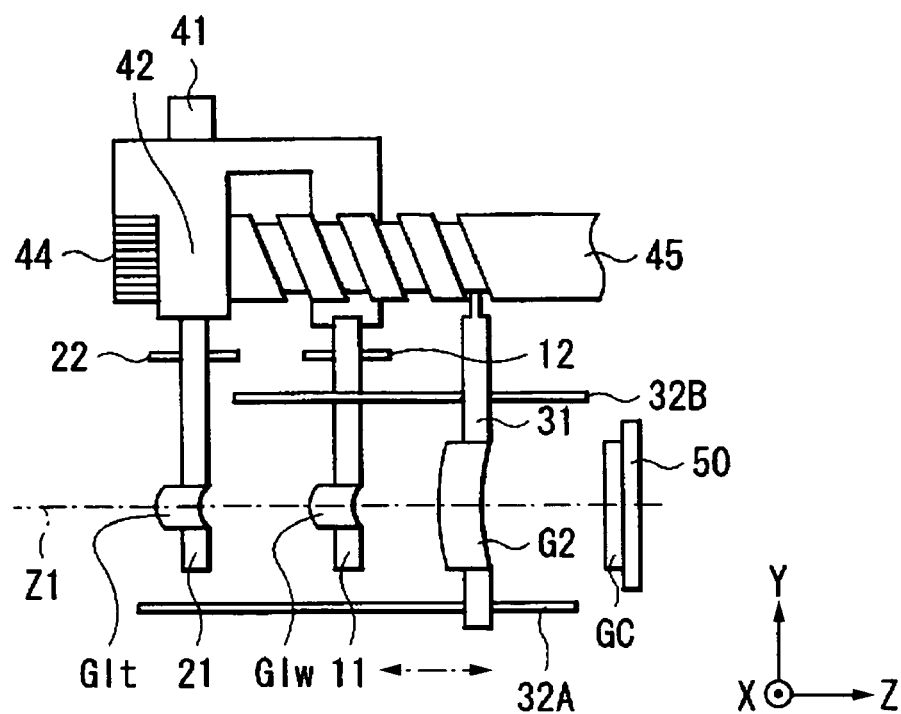
FIG. 18 is a side view showing the focus switching mechanism of the bifocal imaging optical system of the embodiment of the invention.

FIGS. 17 and 18 show an example of the focus switching mechanism. FIG. 17 shows the configuration of the front side, and FIG. 18 shows the configuration of the side face side. As a wide-angle side mechanism, the focus switching mechanism comprises: a wide-angle side lens frame 11 which supports the outer edge of the wide-angle first group G1w; a support shaft 12 which supports one end of the wide-angle side lens frame 11; a tension spring 13 in which one end is attached to the wide-angle side lens frame 11; and a stop rest 14 for stopping the swing of the wide-angle side lens frame 11 to a predetermined position. As a telescope side mechanism, similarly, the focus switching mechanism comprises: a telescope side lens frame 21 which supports the outer edge of the telescope first group G1t ; a support shaft 22 which supports one end of the telescope side lens frame 21; a tension spring 23 in which one end is attached to the telescope side lens frame 21; and a stop rest 24 for stopping the swing of the telescope side lens frame 21 to a predetermined position. As a mechanism for the second group G2, the focus switching mechanism comprises: a second-group lens frame 31 which supports the outer edge of the second group G2; and guide shafts 32A, 32B which support the second-group lens frame 31 so as to be movable in the direction of the optical axis Z1. As shown in FIG. 17, for example, the wide-angle side lens frame 11 and the telescope side lens frame 21 are placed at positions which are approximately symmetrical in a lateral direction about the second-group lens frame 31 as viewed from the front side.

The focus switching mechanism further comprises a switch lever 42 in which a protruding operation unit 41 is disposed in an upper portion. A rack 43 which engages with a gear 44 as shown in FIG. 17 is disposed in a middle portion of the bottom face of the switch lever 42. As shown on FIG. 18, the focus switching mechanism further comprises a cam shaft 45 for moving the second-group lens frame 31 in the direction of the optical axis Z1. An imaging device 50 (see FIG. 18), and the optical components GC such as the cover glass are fixed at predetermined positions on the optical axis Z1.

In the focus switching mechanism, when the switch lever 42 is laterally moved via the operation unit 41, the positions of the wide-angle side lens frame 11 and the telescope side lens frame 21 are switched over with respect to the second-group lens frame 31. In the sate of FIG. 17, the operation unit 41 is leftward moved, the wide-angle side lens frame 11 is swung toward the second group G2 in the plane (in the XY plane in FIG. 17) perpendicular to the optical axis Z1 of the optical system, by the tension force of the tension spring 13 for the wide angle, whereby the configuration of the first group is switched to the wide-angle side. When the state of FIG. 17 is to be switched to the telescope side, the operation unit 41 is rightward moved. As a result, the wide-angle side lens frame 11 is retracted from the optical axis Z1 by the switch lever 42, and the telescope side lens frame 21 is swung toward the second group G2 in the plane perpendicular to the optical axis Z1, by the tension spring 23 for the telescope side, and switching the configuration of the first group is switched to the telescope side. During this switching operation, the cam shaft 45 (FIG. 18) is rotated in an interlocked manner, whereby the second-group lens frame 31 is moved in the direction of the optical axis Z1, and the position of the second group G2 is switched to a position suitable for the telescope optical system.

The focus switching mechanism is of the type in which the first group is interchanged depending on the wide-angle imaging operation or the telephoto imaging operation. As compared with the type in which the second group G2 on the side adjacent to the imaging surface is interchanged, therefore, adherence of dust or the like to the imaging surface due to the switching of the focal length can be prevented from occurring. In the focus switching mechanism, since the second group G2 is moved simply in the direction of the optical axis Z1, a dustproof mechanism such as that surrounding the whole of the range from the second-group lens frame 31 to the imaging surface may be disposed. For the sake of simplicity in description, FIG. 18 shows the state where both the wide-angle first group G1w and the telescope first group G1t are simultaneously placed on the optical axis Z1. Actually, they are not simultaneously placed on the optical axis Z1. In accordance with the above-described switching operation of the operation unit 41, only one of them is placed on the optical axis Z1.

Figure 19:
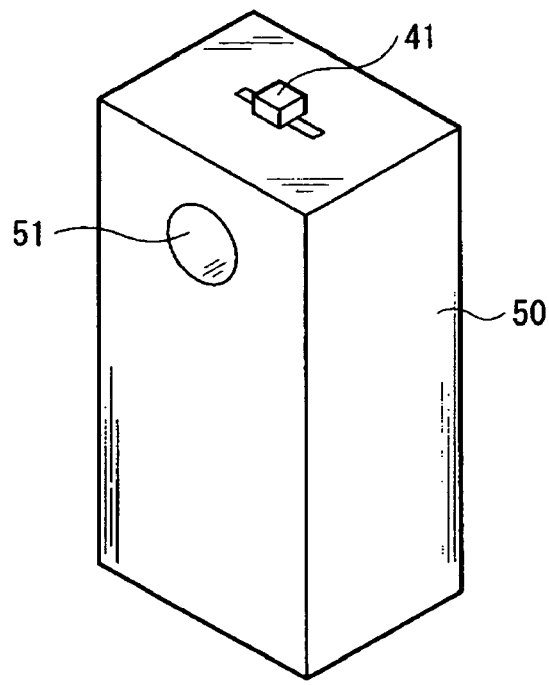
FIG. 19 is an external view showing an imaging apparatus on which a bifocal imaging optical system of the invention is mounted.

FIG. 19 shows in a simplified manner a configuration example in which the bifocal imaging optical system is mounted on an imaging apparatus with using the focus switching mechanism. For example, the imaging apparatus is a digital still camera, a camera-equipped portable telephone, or a personal digital assistance. The imaging apparatus comprises an imaging apparatus main unit (case) 50 having a substantially rectangular parallelepiped shape or the like. An imaging window 51 is disposed in an arbitrary place (for example, a front upper portion) of the imaging apparatus main unit 50. In the imaging apparatus main unit 50, the focus switching mechanism is incorporated so that the optical axis Z1 of the bifocal imaging optical system coincides with the center position of the imaging window 51. A switch operation unit 41 for the focus switching mechanism is incorporated so as to project, for example, from an upper portion of the imaging apparatus main unit 50. When the switch operation unit 41 is operated, therefore, the switching of the focal length of the bifocal imaging optical system is selectively performed. Then, the imaging signal is obtained on the basis of an optical image formed by the bifocal imaging optical system, and a photographed image is obtained based on the imaging signal.

According to the imaging apparatus of the embodiment, as described above, the imaging signal according to an optical image formed by the bifocal imaging optical system of the embodiment is output, and hence the switching between the wide-angle imaging operation and the telephoto imaging operation can be easily performed in accordance with the imaging environment.

EXAMPLES

Next, specific numerical examples of the bifocal imaging optical system of the embodiment will be described. Hereinafter, first and second numerical examples will be collectively described.

FIGS. 4A, 4B show specific lens data corresponding to the configuration on the wide-angle side of the first configuration example shown in FIG. 1A, as Example 1. Similarly, FIGS. 5A, 5B show specific lens data corresponding to the configuration on the telephoto side shown in FIG. 1B. Particularly, FIGS. 4A, 5A show basic lens data, and FIGS. 4B, 5B show data relating to an aspherical surface. In the column of the surface number Si in the lens data shown in FIGS. 4A, 5A, the number of an i-th (i=1 to 6) surface which is numbered in such a manner that the surface of a component that is closest to the object side is set as the first surface, and the number is more sequentially increased as further advancing toward the image side is shown. In the column of the radius of curvature Ri, the value (mm) of the radius of curvature of the i-th surface counted from the object side is shown in correspondence to the reference character Ri used in FIG. 1. Also in the column of the surface separation Di, the separation (mm) on the optical axis between an i-th surface Si counted from the object side and an (i+1)-th surface Si+1 is shown. Ndj indicates the value of the refractive index at the d-line (wavelength=587.6 nm) of a j-th (j=1 to 3) optical component counted from the object side. In the column of vdj, the value of the Abbe number of the j-th optical component counted from the object side at the d-line is shown. FIGS. 4A, 5A show also the values of the paraxial focal length f (mm) of the whole system, the F-number (F No.), and the field angle $2\omega$ ($\omega$=half field angle), as various data.

In the bifocal imaging optical system of Example 1, all of the both surfaces of the lenses have an aspherical shape. In the basic lens data of FIGS. 4A, 5A, values of radii of curvature in the vicinity of the optical axis are shown as the radii of curvature of the aspherical surfaces. In the values indicated as the aspherical data in FIGS. 4B, 5B, the symbol "E" indicates that the value following it is "power exponent" to the base 10, and the value indicated by the power exponent to the base 10 is multiplied with the value preceding "E". For example, "1.0E-02" indicates "$1.0 \times 10^{-2}$".

As the aspherical data, the values of coefficients $A_n$ and K in an expression of an aspherical shape indicated by following expression (A) are written. More specifically, Z indicates the length (mm) of a perpendicular line which is drawn from a point on an aspherical surface existing at a position of the height h from the optical axis Z1, to a tangential plane (plane perpendicular to the optical axis Z1) of the apex of the aspherical surface. In the bifocal imaging optical system of Example 1, each of the aspherical surfaces (third and fourth surfaces) of the second group G2 is shown by effectively using third to tenth coefficients $A_3$ to $A_{10}$ as an aspherical coefficient $A_n$. In each of the aspherical surfaces (first and second surfaces) of the wide-angle first group G1w and the telephoto first group G1t, odd-order coefficients $A_3$, $A_5$, $A_7$, and $A_9$ are zero.

$$Z = C \cdot h^2 / \{1 + (1 - K \cdot C^2 \cdot h^2)^{1/2}\} + \Sigma A_n \cdot h^n \quad (A)$$

(n=an integer of 3 or more)

where

Z: depth (mm) of the aspherical surface h: distance (height) (mm) from the optical axis to the lens surface K: eccentricity (second aspherical coefficient)

C: paraxial curvature=1/R (R: paraxial radius of curvature)

$A_n$: n-th aspherical coefficient.

In the same manner as the bifocal imaging optical system of Example 1, FIGS. 6A, 6B show specific lens data corresponding to the wide-angle side configuration of the second configuration example shown in FIG. 2A, as Example 2. Similarly, FIGS. 7A, 7B show specific lens data corresponding to the telephoto side configuration shown in FIG. 2B. In the same manner as Example 1, also in the both wide-angle and telephoto sides of the bifocal imaging optical system of Example 2, all of the both surfaces of the lenses have an aspherical shape. Furthermore, FIGS. 8A, 8B show specific lens data corresponding to the configuration on the wide-angle side of the third configuration example shown in FIG. 3A, as Example 3. Similarly, FIGS. 9A, 9B show specific lens data corresponding to the configuration on the telescope side shown in FIG. 3B. Also in the bifocal imaging optical system of Example 3, in the same manner as Example 1, all of the both surfaces of the lenses have an aspherical shape in each of the wide-angle and telescope sides.

FIG. 10 collectively shows values relating to the above-mentioned conditional expressions, for each of the examples. As seen from FIG. 10, the values of the examples are within the numerical ranges of the conditional expressions.

FIGS. 11A to 11C show the spherical aberration, astigmatism, and distortion (distortion aberration) of the wide-angle side of the bifocal imaging optical system of Example 1, respectively. Each aberration diagram shows aberration in which the d-line is set as the reference wavelength. In the spherical aberration diagram, also aberrations at the g-line (wavelength=435.8 nm) and the C-line (wavelength=656.3 nm) are shown. In the astigmatism diagram, the solid line indicates the aberration in the sagittal direction, and the broken line indicates the aberration in the tangential direction. F No. indicates the F-number, and ω indicates the half field angle. Similarly, FIGS. 12A to 12C show the aberrations of the telephoto side of the bifocal imaging optical system of Example 1.

Figure 13A:
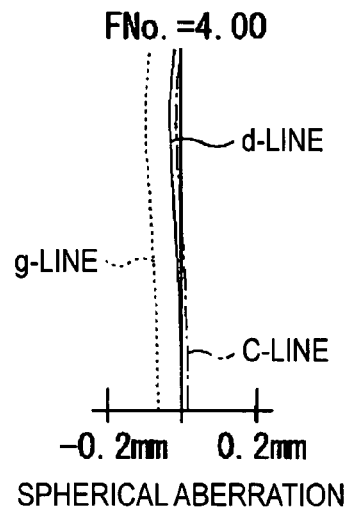
FIGS. 13A to 13C are views showing spherical aberration, astigmatism and distortion of the wide-angle side of the bifocal imaging optical system of Example 2, respectively.
Figure 13B:
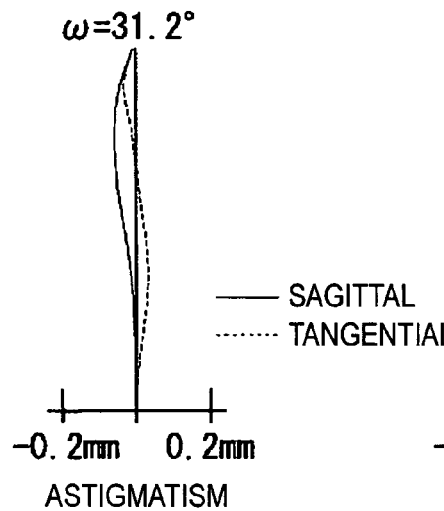
Figure 13C:
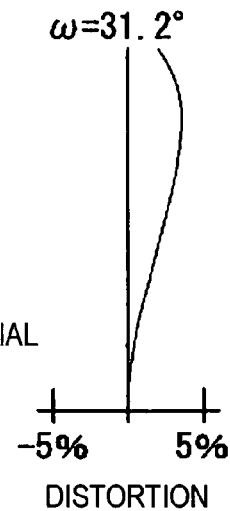
Figure 14A:
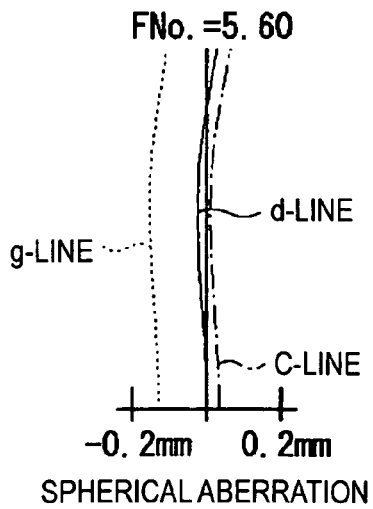
FIGS. 14A to 14C are views showing spherical aberration, astigmatism and distortion of the telephoto side of the bifocal imaging optical system of Example 2, respectively.
Figure 14B:
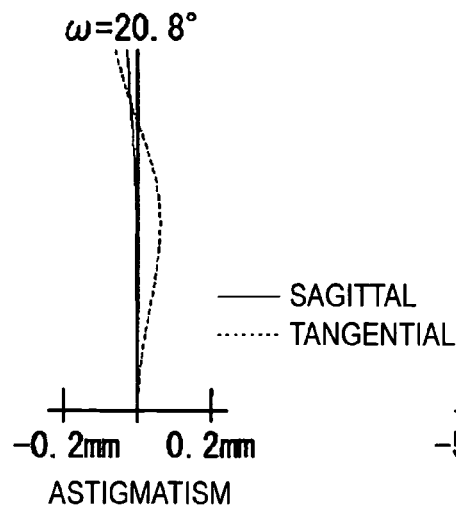
Figure 14C:
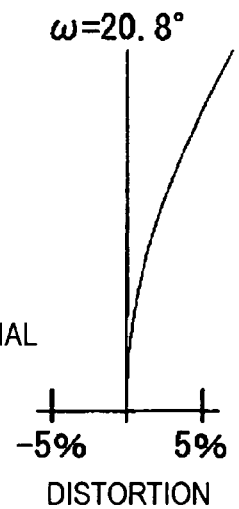
Figure 15A:
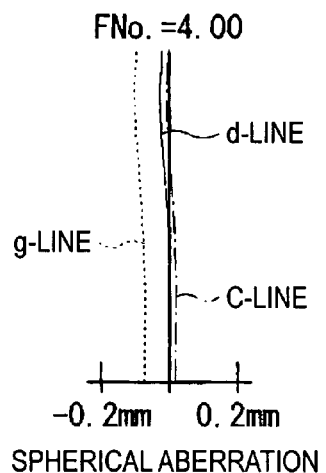
FIGS. 15A to 15C are views showing spherical aberration, astigmatism and distortion of the wide-angle side of the bifocal imaging optical system of Example 3, respectively.
Figure 15B:
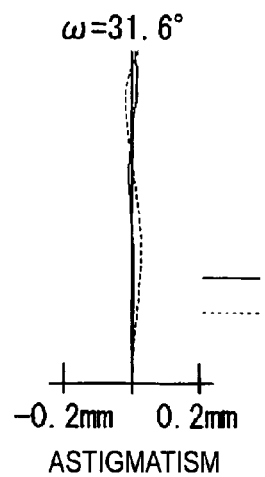
Figure 15C:
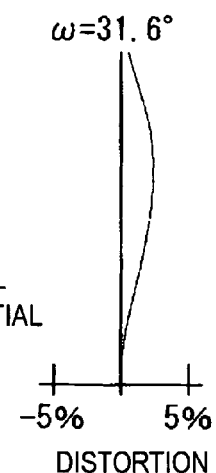
Figure 16A:
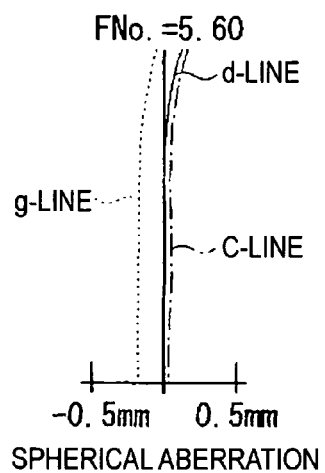
FIGS. 16A to 16C are views showing spherical aberration, astigmatism and distortion of the telephoto side of the bifocal imaging optical system of Example 3, respectively.
Figure 16B:
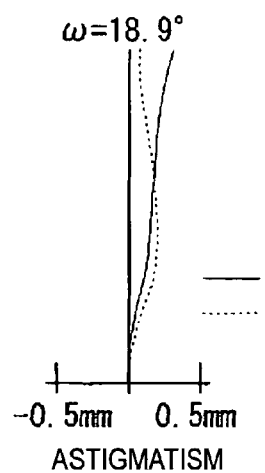
Figure 16C:
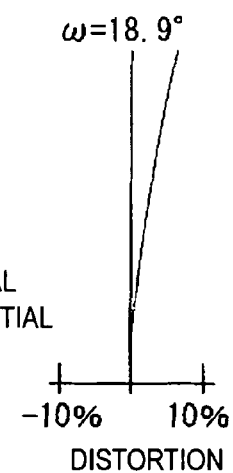

Similarly, FIGS. 13A to 13C show the aberrations of the wide-angle side of the bifocal imaging optical system of Example 2, and FIGS. 14A to 14C show the aberrations of the telephoto side. Further similarly, FIGS. 15A to 15C show the aberrations of the wide-angle side of the bifocal imaging optical system of Example 3, and FIGS. 16A to 16C show the aberrations of the telescope side.

As seen from the numeral data and the aberration diagrams, all the examples can realize a high-performance bifocal imaging optical system in which, although a small and simple lens configuration is employed, aberration correction can be satisfactory performed in the wide-angle and telephoto sides.

The invention is not restricted to the embodiment and the examples, and various modifications are enabled. For example, the radius of curvature, the surface separation, and the refractive index of each lens component, and the like are not limited to the values of the numerical examples, and may have other values.

Although description has been given heretofore of the invention with reference to the above-mentioned embodiments and examples, the invention is not limited to such embodiments and examples but various modifications are also possible. For example, the values of the radii of curvature, surface intervals and refractive indexes of the respective lens components are not limited to the values that are shown in the above-mentioned numerical examples, but other values can also be used. Also, in the above-mentioned embodiments and examples, the both surfaces of the first to fourth lenses are all formed as aspherical surfaces; however, the invention is not limited to this.

This application claims foreign priority from Japanese Patent Application Nos. 2006-258737 and 2007-240972, filed Sep. 25, 2006 and Sep. 18, 2007, respectively, the entire disclosure of which is herein incorporated by reference.

What is claimed is:

1. A bifocal imaging optical system comprising:
a first group for wide angle imaging, which includes one lens and has a positive refractive power;
a first group for telephoto imaging, which includes one or two lenses and has a positive refractive power as a whole; and
a second group including one lens and having a positive refractive power, the second group being commonly used with both of the first group for wide angle imaging and the first group for telephoto imaging, wherein
each of the first group for wide angle imaging, the first group for telephoto imaging and the second group has at least one aspherical surface,
the first group for a wide angle and the first group for a telephoto are selectively used so as to switch an overall focal length of the bifocal imaging optical system between two focal lengths, wherein when a wide-angle imaging operation is performed, the first group for wide angle imaging and the second group are arranged on an optical axis sequentially from an object side of the bifocal imaging optical system, and when a telephoto imaging operation is performed, the first group for telephoto imaging and the second group are arranged on the optical axis sequentially from the object side, and
the bifocal imaging optical system satisfies conditional expressions:

$$1.0 < f1w/fw < 3.0 \tag{1}$$

$$2.0 < f2/fw < 4.0 \tag{2}$$

$$2.5 < f1t/fw < 4.0 \tag{3}$$

wherein
fw is an overall focal length of the bifocal imaging optical system in a wide-angle side,
f1w is a focal length of the first group for wide angle imaging,
f1t is a focal length of the first group for telephoto imaging, and
f2 is a focal length of the second group.

2. The bifocal imaging optical system according to claim 1, wherein
the first group for wide angle imaging includes a meniscus lens having a positive refractive power and having a convex surface on the object side,
the first group for telephoto imaging includes at least one meniscus lens having a positive refractive power and having a convex surface on the object side, and
the second group includes a meniscus lens having a positive refractive power and having a convex surface on the object side in the vicinity of the optical axis.

3. The bifocal imaging optical system according to claim 1, wherein the second group is a plastic lens.

4. The bifocal imaging optical system according to claim 2, wherein the second group is a plastic lens.

5. An imaging apparatus comprising: a bifocal imaging optical system according to claim 1; and an imaging device that outputs an imaging signal corresponding to an optical image formed by the bifocal imaging optical system.

* * * * *